(12) United States Patent
Flickinger et al.

(10) Patent No.: US 7,810,114 B2
(45) Date of Patent: Oct. 5, 2010

(54) ADVERTISEMENT FILTERING AND STORAGE FOR TARGETED ADVERTISEMENT SYSTEMS

(75) Inventors: Gregory C. Flickinger, Furlong, PA (US); Charles A. Eldering, Doylestown, PA (US)

(73) Assignee: Prime Research Alliance E., Inc., Tortola (VG)

( * ) Notice: Subject to any disclaimer, the term of this patent is extended or adjusted under 35 U.S.C. 154(b) by 1315 days.

(21) Appl. No.: 11/134,146

(22) Filed: May 20, 2005

(65) Prior Publication Data
US 2005/0210502 A1  Sep. 22, 2005

Related U.S. Application Data

(63) Continuation of application No. 09/748,949, filed on Dec. 27, 2000.

(60) Provisional application No. 60/229,156, filed on Aug. 31, 2000.

(51) Int. Cl.
*H04N 7/10* (2006.01)
*H04N 7/025* (2006.01)

(52) U.S. Cl. .................. 725/32; 725/34; 725/36; 725/94

(58) Field of Classification Search .............. 725/32, 725/34–36
See application file for complete search history.

(56) References Cited

U.S. PATENT DOCUMENTS

| | | |
|---|---|---|
| 4,602,279 A | 7/1986 | Freeman |
| 4,630,108 A | 12/1986 | Gomersall |
| 5,155,591 A | 10/1992 | Wachob |
| 5,231,494 A | 7/1993 | Wachob |
| 5,271,626 A | 12/1993 | Llenas et al. |
| 5,351,075 A | 9/1994 | Herz |

(Continued)

FOREIGN PATENT DOCUMENTS

CA    2264392    1/1999

(Continued)

OTHER PUBLICATIONS

U.S. Appl. No. 09/204,888, filed Dec. 3, 1998, Eldering, Charles.

(Continued)

*Primary Examiner*—Joseph P Hirl
*Assistant Examiner*—Jivka Rabovianski
(74) *Attorney, Agent, or Firm*—Carlineo, Spicer & Kee, LLC

(57) ABSTRACT

An advertisement storage and filtering system for selectively identifying targeted advertisements to be stored in the memory of the STB. This storing of the selected advertisements can be accomplished in a number of ways. In one embodiment, the advertisements, in real-time and as they are received at the STB, are processed by the STB and only those advertisements with the appropriate characteristics are stored on the hard drive (HD). This may require some buffering of the advertisements in the STB memory as the STB processes and determines whether or not to store the advertisement. The information required to determine whether or not to store the advertisement could also be sent in advance, e.g., as a data service in an advertisement channel. Alternatively, the STB may store incoming advertisements in a memory temporarily and subsequently determine whether or not to retain the stored advertisements.

24 Claims, 9 Drawing Sheets

U.S. PATENT DOCUMENTS

| | | |
|---|---|---|
| 5,410,344 A | 4/1995 | Graves et al. |
| 5,446,919 A | 8/1995 | Wilkins |
| 5,515,098 A | 5/1996 | Carles |
| 5,550,578 A | 8/1996 | Hoarty et al. |
| 5,565,909 A | 10/1996 | Thibadeau et al. |
| 5,592,551 A | 1/1997 | Lett |
| 5,600,364 A | 2/1997 | Hendricks et al. |
| 5,600,366 A | 2/1997 | Schulman |
| 5,600,573 A | 2/1997 | Hendricks |
| 5,621,728 A | 4/1997 | Lightfoot et al. |
| 5,635,978 A | 6/1997 | Alten |
| 5,636,346 A | 6/1997 | Saxe |
| 5,650,994 A | 7/1997 | Daley |
| 5,657,072 A | 8/1997 | Aristides |
| 5,661,516 A | 8/1997 | Carles |
| 5,687,095 A | 11/1997 | Haskell |
| 5,724,091 A | 3/1998 | Freeman et al. |
| 5,740,549 A | 4/1998 | Reilly et al. |
| 5,752,160 A | 5/1998 | Dunn |
| 5,754,938 A | 5/1998 | Herz |
| 5,754,939 A | 5/1998 | Herz |
| 5,758,257 A | 5/1998 | Herz et al. |
| 5,758,328 A | 5/1998 | Giovannoli |
| 5,761,601 A * | 6/1998 | Nemirofsky et al. .......... 725/34 |
| 5,774,170 A | 6/1998 | Hite et al. |
| 5,781,226 A | 7/1998 | Sheehan |
| 5,790,935 A | 8/1998 | Payton |
| 5,801,747 A | 9/1998 | Bedard |
| 5,801,753 A | 9/1998 | Eyer et al. |
| 5,815,671 A | 9/1998 | Morrison |
| 5,848,352 A | 12/1998 | Dougherty |
| 5,864,823 A | 1/1999 | Levitan |
| 5,918,014 A | 6/1999 | Robinson |
| 5,926,205 A | 7/1999 | Krause et al. |
| 5,931,901 A | 8/1999 | Wolfe et al. |
| 5,948,061 A | 9/1999 | Merriman et al. |
| 5,959,688 A | 9/1999 | Schein |
| 5,966,120 A | 10/1999 | Arazi et al. |
| 5,990,927 A | 11/1999 | Hendricks et al. |
| 6,002,393 A | 12/1999 | Hite et al. |
| 6,002,394 A | 12/1999 | Schein et al. |
| 6,009,410 A | 12/1999 | LeMole et al. |
| 6,020,880 A | 2/2000 | Naimpally |
| 6,026,369 A | 2/2000 | Capek |
| 6,029,045 A * | 2/2000 | Picco et al. .................... 725/34 |
| 6,029,195 A | 2/2000 | Herz |
| 6,055,510 A | 4/2000 | Henrick |
| 6,088,722 A | 7/2000 | Herz et al. |
| 6,119,098 A | 9/2000 | Guyot et al. |
| 6,130,726 A | 10/2000 | Darbee |
| 6,141,010 A | 10/2000 | Hoyle |
| 6,144,653 A | 11/2000 | Persson et al. |
| 6,160,570 A | 12/2000 | Sitnik |
| 6,177,931 B1 | 1/2001 | Alexander et al. |
| 6,181,334 B1 | 1/2001 | Freeman |
| 6,253,238 B1 | 6/2001 | Lauder et al. |
| 6,263,501 B1 | 7/2001 | Schein et al. |
| 6,370,199 B1 | 4/2002 | Bock |
| 6,418,122 B1 | 7/2002 | Schoenblum et al. |
| 6,424,998 B2 | 7/2002 | Hunter |
| 6,425,131 B2 | 7/2002 | Crandall et al. |
| 6,434,747 B1 | 8/2002 | Khoo et al. |
| 6,446,082 B1 | 9/2002 | Arita |
| 6,459,427 B1 | 10/2002 | Mao et al. |
| 6,460,036 B1 | 10/2002 | Herz |
| 6,463,585 B1 | 10/2002 | Hendricks et al. |
| 6,487,721 B1 | 11/2002 | Safadi |
| 6,516,002 B1 | 2/2003 | Huang et al. |
| 6,571,279 B1 | 5/2003 | Herz |
| 6,615,039 B1 | 9/2003 | Eldering |
| 6,631,523 B1 | 10/2003 | Matthews, III et al. |
| 6,637,029 B1 | 10/2003 | Maissel et al. |
| 6,675,385 B1 | 1/2004 | Wang |
| 6,684,194 B1 | 1/2004 | Eldering et al. |
| 6,698,020 B1 | 2/2004 | Zigmond et al. |
| 6,704,930 B1 | 3/2004 | Eldering |
| 6,718,551 B1 * | 4/2004 | Swix et al. .................... 725/32 |
| 6,724,974 B2 | 4/2004 | Naruto et al. |
| 6,738,978 B1 | 5/2004 | Hendricks et al. |
| 6,760,916 B2 * | 7/2004 | Holtz et al. ................... 725/34 |
| 6,796,555 B1 | 9/2004 | Blahut |
| 7,003,792 B1 | 2/2006 | Yuen |
| 7,146,627 B1 * | 12/2006 | Ismail et al. .................. 725/47 |
| 2001/0014975 A1 | 8/2001 | Gordon |
| 2001/0025377 A1 | 9/2001 | Hinderks |
| 2001/0049620 A1 * | 12/2001 | Blasko ....................... 705/10 |
| 2001/0049820 A1 | 12/2001 | Barton |
| 2002/0026645 A1 | 2/2002 | Son et al. |
| 2002/0038455 A1 | 3/2002 | Srinivasan et al. |
| 2002/0104083 A1 | 8/2002 | Hendricks et al. |
| 2002/0129374 A1 | 9/2002 | Freeman et al. |
| 2002/0152471 A1 | 10/2002 | De Haas |
| 2003/0088872 A1 | 5/2003 | Maissel et al. |
| 2003/0135853 A1 | 7/2003 | Goldman |
| 2003/0200128 A1 | 10/2003 | Doherty |
| 2005/0235318 A1 * | 10/2005 | Grauch et al. ................. 725/46 |

FOREIGN PATENT DOCUMENTS

| | | |
|---|---|---|
| WO | WO9712486 | 4/1998 |
| WO | WO9827723 | 6/1998 |
| WO | WO9952285 | 10/1999 |
| WO | WO9955066 | 10/1999 |
| WO | WO9966719 | 12/1999 |
| WO | WO 0054504 | 9/2000 |
| WO | WO 0069163 | 11/2000 |
| WO | WO 0147279 | 6/2001 |
| WO | WO 0049801 | 10/2001 |
| WO | WO 0233973 | 4/2002 |
| WO | WO 0233975 | 4/2002 |

OTHER PUBLICATIONS

U.S. Appl. No. 09/553,637, filed Apr. 20, 2000, Flickinger, Gregory C.
U.S. Appl. No. 09/635,539, filed Aug. 10, 2000, Eldering, Charles.
U.S. Appl. No. 09/635,542, filed Aug. 10, 2000, Eldering, Charles.
AdLink Engineering, Ad Insertion Wiring Diagrams, 1999, 17 pgs.
NCTA Technical Papers, "Compressed Digital Commercial Insertion: New Technology Architectures for the Cable Advertising Business", 1992, 8 pgs.
Claria Website, www.claria.com;May 19, 2005, 3 pgs.

* cited by examiner

300

| $Q_1$ | FORD | ~301 |
|---|---|---|
| $Q_2$ | BURGER KING | ~303 |
| $Q_3$ | REVLON | ~305 |
| $Q_4$ | KMART | ~307 |
| ⋮ | ⋮ | |
| $Q_m$ | KIM'S GIFT SHOP | ~321 |

*FIG. 3*

ADVERTISEMENT FILTERING AND STORAGE FOR TARGETED ADVERTISEMENT SYSTEMS

CROSS-REFERENCE TO RELATED APPLICATIONS

This application is a continuation of copending U.S. patent application Ser. No. 09/748,949, filed on Dec. 27, 2000, and entitled "Advertisement Filtering and Storage for Targeted Advertisement Systems", which claims the benefit of U.S. Provisional Application No. 60/229,156 filed on Aug. 31, 2000, and entitled "Method and System for Addressable and Program Independent Advertising", each of the disclosures of which are incorporated herein by reference.

BACKGROUND OF THE INVENTION

Whether the television programming service is being provided by antenna broadcast, analog cable, digital broadcast satellite (DBS), digital cable, switched digital video (SDV) or any other means, generally all viewers (subscribers) of a particular program will see the same advertisements (ads) in the same order at the same times. In essence, each ad is "linked" to a particular point within a particular program. This traditional paradigm for delivering ads in the stream of television programming is herein termed linked advertising. If any particular subscriber is not viewing the particular program at the particular time, he or she will not see the ad. That is, in linked advertising, the ads are simply part of the data stream from the head end (HE), i.e., from the central office of the television service provider, to all subscribers of that service.

However, with modern digital television service methods, including SDV systems (in which television service is received over the telephone lines via a very high speed digital subscriber line (VDSL)) and digital cable, both of which utilize the concept of addressable set-top boxes (STBs), more personalized service is now available. For instance, in both types of systems, two-way communication between the subscriber's STB and the service provider via the network is possible. Further, the service provider can send different data to different subscribers.

In telephone based systems such as SDV, the service provider can actually send different information to any individual subscriber. In fact, in one embodiment, the VDSL television delivery standard essentially is an access network utilizing asynchronous transfer mode (ATM) protocol. In digital cable systems, different data can be sent to different groups of customers.

Accordingly, it is an object of the present invention to provide an improved method and apparatus for delivering advertising via a network, such as a television service network.

It is another object of the present invention to provide a method and an apparatus for ad filtering and storage of targeted ads.

It is a further object of the present invention to provide a method and apparatus by which targeted ads can be inserted into the television program stream in a targeted fashion either by individual subscriber or group of subscribers on a network.

It is a further object of the present invention to provide a method and apparatus for providing targeted ads to individual subscribers or groups of subscribers on a network.

BRIEF SUMMARY OF THE INVENTION

The present invention is directed at a method and apparatus for providing targeted advertisements (ads) to the subscriber terminals, e.g., set-top boxes (STBs). In particular, the invention provides an ad storage and filtering system for selectively identifying targeted ads to be stored in memory of the STB.

This storing of the selected ads can be accomplished in a number of ways. In one embodiment, the ads, in real-time and as they are received at the STB, are processed by the STB and only those ads with the appropriate characteristics are stored on the hard drive (HD). This may require some buffering of the ads in the STB memory as the STB processes and determines whether or not to store the ad. The information required to determine whether or not to store the ad can be sent in advance, e.g., as a data service in an ad channel.

Alternatively, the STB may store incoming ads in a memory temporarily and subsequently determine whether or not to retain the stored ads. A determination step may be performed to determine whether each stored ad is appropriate or not, wherein the ads found to be inappropriate are deleted.

In one embodiment, an ad channel that comprises ads to be delivered to the STBs as well as metadata relating to splice-timing and other instruction is generated. The metadata may be encoded on the ad channel via an encoder, e.g., a vertical blanking encoder. At the subscriber end, the STB decodes the ad channel, retrieves the associated timing and other instructional information, selects the appropriate ads and stores the selected ads in appropriate splice windows for subsequent ad insertion.

While the invention is particularly suitable for inserting targeted ads into television programming, the invention is readily adaptable to inserting any particular data into any particular stream of other data transmitted via a communications system. Such systems can include targeted advertising in Electronic Program Guides (EPGs) or digital overlay/insertion systems.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIG. 3 illustrates an exemplary advertisement queue;

DETAILED DESCRIPTION OF THE INVENTION

Figure 1:
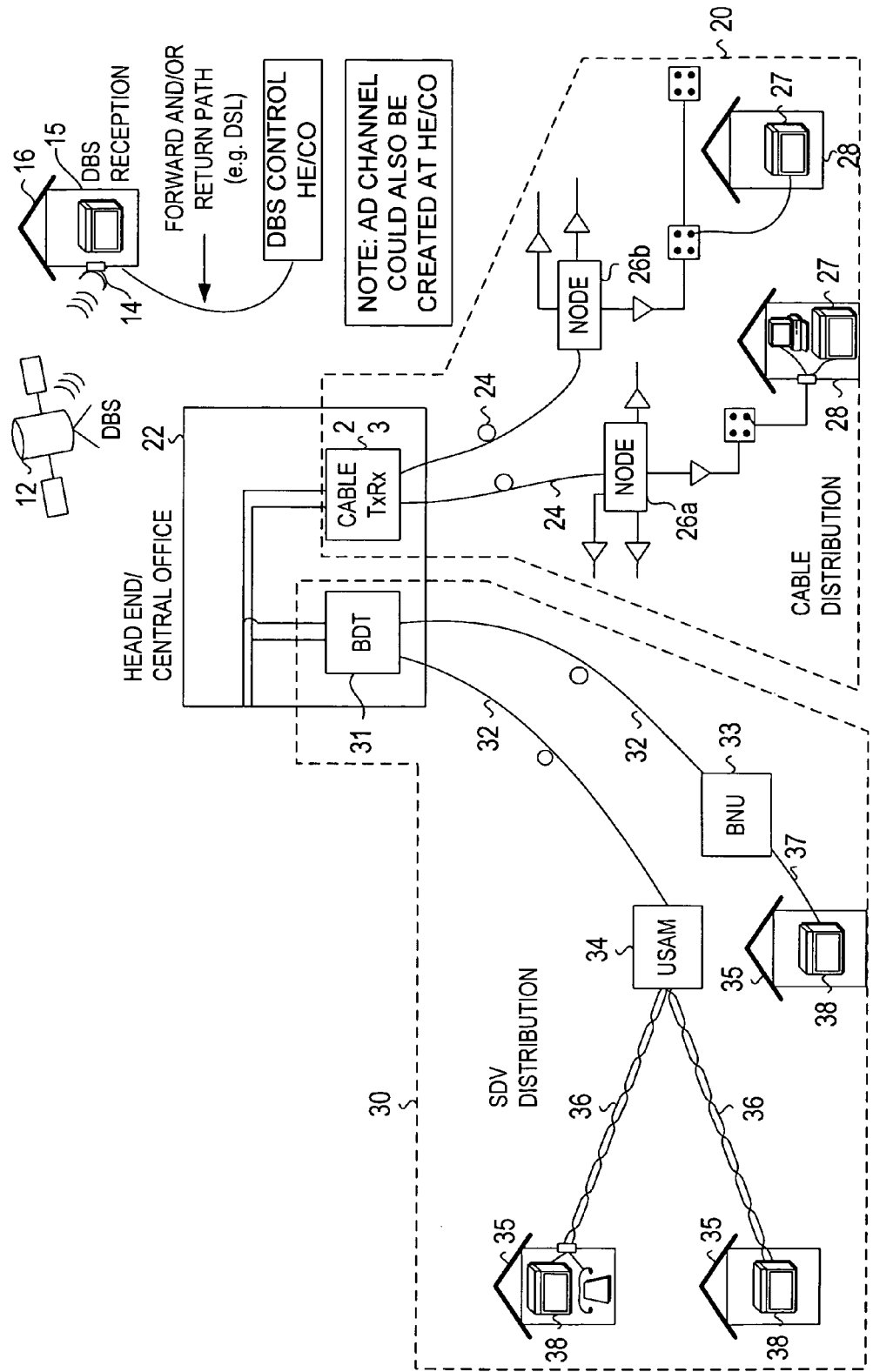
FIG. 1 is a block diagram of an exemplary television service communication network.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 9 in particular, the apparatus of the present invention is disclosed.

FIG. 1 generally illustrates three of the most common types of digital television service delivery networks with which the present invention can be suitably used. These include (1) Switched Digital Video (SDV) using, for instance, very high speed digital subscriber line (VDSL), (2) digital cable and (3) digital broadcast satellite (DBS). The invention is also applicable to digital broadcast television including Multipoint Multichannel Distribution System (MMDS) and Local Multichannel Distribution System (LMDS).

In a DBS system, a programming stream comprising upwards of one hundred channels of television programming is delivered directly from a geo-stationary satellite transmitter 12 orbiting the earth to a receiving antenna 14 mounted on or near each subscriber's home 16. The channels are transmitted from the antenna 14 via a cable to a satellite receiving station 15 (which is a form of set-top box (STB)) in the subscriber's home 16. The STB 15 selects a channel and demodulates the signal for delivery to a monitor (e.g., a television, not shown). Most DBS systems are arranged such that data can also be sent in the upstream direction, that is, from the STB 15 to the DBS provider. In most DBS systems, the STB 15 is also coupled to the telephone line and is designed and programmed to place telephone calls to the DBS service provider to periodically send information in the upstream direction. Such information may commonly comprise requests for Pay-Per-View (PPV) programs, requests for changes in the subscription (a request that one or more premium channels be added to the service, etc.). Moreover, hybrid DBS/DSL systems, providing high speed DSL landlines for both upstream and downstream communications are becoming commonplace.

In a typical digital cable network 20, multiple channels of television information are transmitted from a head end (HE) or central office (CO) 22 via a cable transmitter 23. Particularly, the channels are transmitted via cables 24 to nodes 26. The nodes 26 are essentially switching/routing stations which service multiple homes (usually a few hundred). The nodes 26 route the signals to individual subscribers 28. The individual subscriber 28 will have STBs 27 that select a particular channel from the transmit stream, demodulate it and forward it for display on one or more monitors or televisions (not shown). Different data streams can be sent to the different nodes 26 of the network such that households coupled to node 26a can receive different programming than households coupled to node 26b. Thus, such systems are "addressable" by node, but not by individual subscriber. Upstream information may be sent from the STB 27 to the HE/CO 22 via a dedicated upstream channel over the cable. In cable systems that do not support two-way communication, the upstream "channel" can be through the telephone as described above in connection with DBS systems.

In accordance with a third common type of system, namely, switched digital video (SDV) 30, television programming is transmitted over the regular telephone network. Particularly, television signals are transmitted from the Central Office (CO) 22 via a broadband digital terminal (BDT) 31 over wire, typically fiber optic cable 32, to a universal service access multiplexer (USAM) 34 which then delivers the data to multiple individual subscriber/households 35 via regular telephone twisted wire pair 36 using VDSL modems and protocols. The USAM 34 receives a wide bandwidth signal comprising some or all of the television channels. However, because of the bandwidth limitations of twisted wire pair 36, typically only about one to four channel of television programming at a time can be delivered from the USAM 34 to the subscriber/household 35, depending, inter alia, on the physical distance of the residence from the USAM 34.

Accordingly, the subscriber/household 35 has a STB 38 that receives subscriber channel changes, and transmits them to the USAM 34, and then to the BDT 31. The BDT 31 switches the channel for the subscriber and sends the newly selected channel to the subscriber/household 35. SDV systems 30 are essentially fully modern asynchronous two-way communication networks. Accordingly, the STB 38 can transmit information upstream via the same VDSL modem that receives the downstream signals. SDV systems 30 typically operate using an asynchronous transfer mode (ATM) protocol, which is well-known in the networking arts.

In an alternative embodiment, the signals are transmitted from the HE/CO 22 via the BDT 31 to a broadband network unit (BNU) 33. The BNU 33 delivers the data to individual households 35 using coaxial cable 37.

Figure 2:
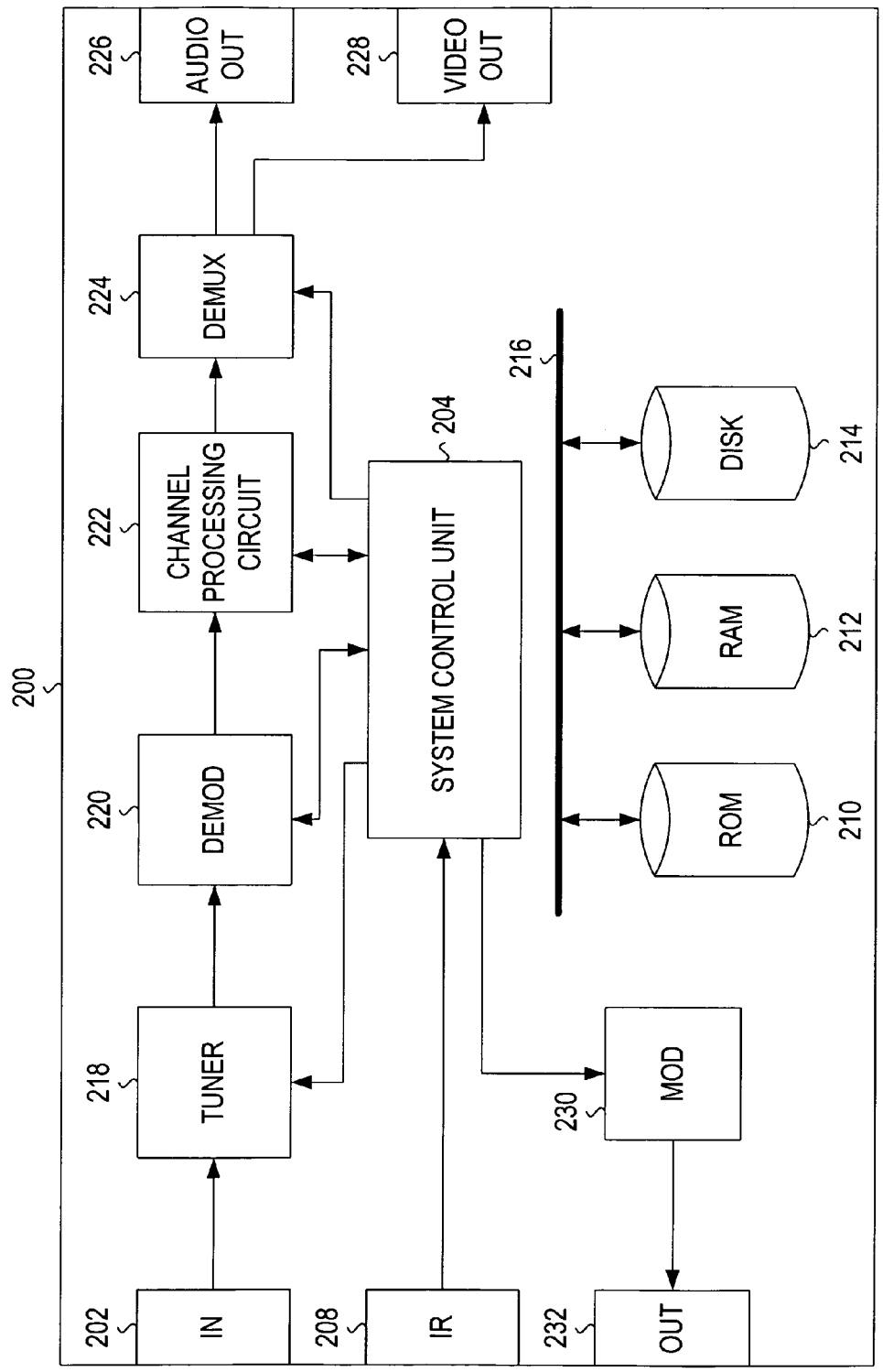
FIG. 2 is a block diagram of an exemplary set-top box of FIG. 1.

FIG. 2 is a block diagram showing the basic components of a STB 200 within which the present invention may be incorporated, whether it be for DBS, SDV, digital cable or any other system. The STB 200 includes an input port 202 for receiving to an input signal, e.g., a coaxial cable in the case of analog or digital cable TV, the telephone line in the case of SDV or an input cable from an antenna in the case of DBS. The input signal may be an analog or digital television input signal. Alternatively, the input signal may be a video stream or multimedia stream such as a motion picture expert group (MPEG) signal from any communications network, such as the Internet. The STB 200 includes a system control unit (SCU) 204 which controls operation of the components of the STB 200. The SCU 204 essentially is a central processing unit (CPU) and may be any digital processing device, such as a microprocessor, finite state machine (FSM), digital signal processor (DSP), application specific integrated circuit (ASIC), general purpose computer, etc. The SCU 204 receives commands from the subscriber, such as through infrared (IR) reception of commands from a handheld remote control unit (not shown) through an IR receiving circuit 208. The SCU 204 decodes the commands and forwards control signals to other circuits in the STB 200 in order to carry out the subscriber's commands, such as changing the channel. The STB 200 further includes a read only memory (ROM) 210 containing software and fixed data used for operating the STB 200, and a random access memory (RAM) 212 for storing changeable data, such as the instructions and ads in accordance with the present invention. Preferably, the STB 200 also includes a separate internal or external large memory device, such as a hard disk (HD) 214 or optical disk drive for storing the very large amounts of data that comprise digital multimedia data, e.g., television programs and ads. The SCU 204, RAM 212, ROM 210 and HD 214 are coupled to a master bus 216 over which the units can communicate with each other.

The input signal from input port 202 is passed through a tuning circuit 218. Under the control of the SCU 204, the tuning circuit 218 selectively passes out the data corresponding to the particular channel selected by the subscriber. The data is passed to a demodulator 220 that demodulates the data. A channel processing circuit 222 takes the demodulated channel data and processes it as needed. The necessary channel processing may comprise almost nothing to significant processing of the data depending on the particular form of the input data and the features of the STB 200, which would be familiar to persons of ordinary skill in the related arts. Exemplary functions that might be performed in the channel processing circuitry 222 include decoding an encoded data stream (e.g., MPEG, Dolby SurroundSound™) or inserting ads into the data stream in accordance with the present invention.

If received data is to be stored locally at the STB 200, the channel processing circuit 222 can pass the data to one of the memory devices 210, 212 or 214 through the SCU 204.

The output of the channel processing circuit 222 is typically coupled to a demultiplexer 224 which separates the audio and video portions of the channel and forwards them to audio output ports 226 and video output ports 228.

At least the tuner 218 and the channel processing circuit 222 are controlled by the SCU 204. However, the demodulator 220 and demultiplexer 224 may also need control.

Many STBs 200 can also transmit data upstream to the HE. Such STBs 200 would include a modulator 230 coupled to the SCU 204 for modulating data generated in the SCU 204 via an output port 232 and a cable or other link to the HE. It will be understood by those of ordinary skill in the art that the input port 202 and output port 232 might comprise the same physical port.

It also will be apparent to those of ordinary skill in the related arts that FIG. 2 is a very high level depiction of the most basic components of an STB 200 and that other forms are possible.

The invention will now be described in connection with the particular embodiment in which it is used to insert ads into television programming. However, it should be understood by persons of ordinary skill in the art that the invention can be used to insert any data into any other data stream. For instance, the invention can be applied to the Internet, streaming audio data, etc. It may also be applied to insert ads in the electronic program guides (EPGs) that are frequently provided in one channel of television programming and which commonly include ads in a portion of the display. The system can also be utilized for the management of ads which are inserted directly into a portion of the screen during the actual programming, such as those ads which are electronically placed on the billboards in sports arenas or on the field. Such ad insertion technology is commercially available from companies such as Princeton Video Image, Inc., of Lawrenceville, N.J. Preferably, the information stream includes particular time intervals which are dedicated for insertion of such external data. However, the invention can be utilized to replace existing data in the data stream, if desired. In the nomenclature of the specification, such designated intervals are termed "avails".

In accordance with a preferred embodiment of the invention, the various television programming channels include open ad (commercial) breaks designated specifically for the insertion of ads by the television service provider. That is, the normal stream of information in the channel includes intervals (avails), typically containing one or more default ads, in which an alternate ad from a source, external to the channel data itself, can be inserted into that avail (i.e., substituted for the default ad). The avails may also be created when a program is recorded on a STB 200 with memory or a personal video recorder.

The ads chosen are preferably stored in a memory local to the STB 200. The local memory for storing the ad may comprise any high volume memory, including, but not limited to, RAM 212, magnetic HD 214, FLASH, and optical storage media such as optical disks. Alternately, the ads can be stored on a remote server coupled to the communications network.

In accordance with one embodiment of the invention, the STB 200 determines whether the equipment is turned on and, if so, to what particular channel it is tuned, detects avails in that channel, and inserts the identified ads into the avails as they arrive.

Thus, in accordance with the invention, ads are no longer linked to any particular ad spot in any particular program. In accordance with the invention, a virtual roadblock can be set up whereby the subscriber will receive the designated ads in the designated order as avails occur in whatever programming he or she is viewing, regardless of the channel, program or time of day. In this manner, advertisers can more specifically reach their target audience while also being given a much higher level of confidence that their ads have actually been viewed by their target audience.

In traditional linked advertising, the advertiser pays to have an ad displayed in a designated time slot in a designated channel, regardless of who or how many subscribers (viewers) are tuned to that channel at that time. In accordance with the present invention, the ad is not played to any subscriber unless that subscriber's STB 200 is turned on. Further, the ad is played in the channel to which the STB 200 is tuned, thus virtually guaranteeing that the subscriber actually sees the ad that the advertiser has paid to have displayed.

Moreover, the television service provider can address individual STBs 200 or at least groups of STBs 200 depending on the particular network and instruct them to insert the particular ad. Accordingly, the television service provider can sell advertising space to advertisers in a much more targeted fashion than in the prior art.

Ad identifiers may be transmitted to the individual STBs 200 from a central location of the television service provider in any reasonable manner. Preferably, the ads themselves are also transmitted to the STBs 200 for storage until they are "played". Several manners are well known in connection with existing digital cable and VDSL systems for transmitting data to individual receiving nodes coupled to the network. For instance, VDSL systems essentially operate on an ATM protocol with video typically being carried as MPEG data. In digital cable and DBS systems, ads can be delivered in MPEG transport streams.

Numerous means are available for delivering targeted ads to the STBs 200 for placement in the program streams as well as delivering the ads themselves for storage. Common to all of these architectures are multiple forward channels (CO/HE 22 transmitting to STBs 200) and one return channel (STB 200 transmitting to the CO/HE 22). One of the forward channels (hereinafter the ad channel) may be dedicated to delivering the ads, metadata about the ads and instructions for the STBs 200 regarding how the ads are to be organized. The ads may be stored in one or more queues, wherein the queue is an ordered list dictating an order in which ads should be inserted.

FIG. 3 illustrates an exemplary ad queue 300. The queue 300 consists of m slots ($Q_1$-$Q_m$) with each slot containing an ad identified by its corresponding AD_ID. It is to be noted that the AD_ID may be a pointer such as an ad resource locator (ARL) wherein the pointer points to the STB 200 from where to extract the contents of the corresponding ad. For exemplary purposes, FIG. 3 illustrates a queue 300 having m slots labeled as $Q_1$, $Q_2$, -$Q_m$, each stack having a corresponding ARL or AD_ID. In FIG. 3, the $Q_1$ slot 301 points to a Ford ad, the $Q_2$ slot 303 points to a Burger King ad, the $Q_3$ slot 305 points to a Revlon ad, the $Q_4$ slot 307 points to a K-Mart ad, and the $Q_m$ slot 321 points to a Kim's Gift Shop ad.

The return path/channel is used for, inter alia, communicating to the service provider, which ads are stored at the STB 200, which ads have been played and when, which ads are scheduled for play, etc. Such information is critical for selling and charging the advertisers for playing the ads. The return path would typically be a low bandwidth channel since the amount of data transmitted upstream is very limited relative to the video and audio data, which is transmitted in the downstream channels. Also, as previously noted, the return path need not be through the same network as the downstream path. For instance, as discussed above in connection with SDV or DBS, the return path can be through a modem via Plain Old Telephone Service (POTS) or over a DSL.

In one exemplary embodiment, a service provider (i.e., DBS, cable, SDV, multichannel multipoint distribution system (MMDS), local multipoint distribution system (LMDS)) allocates and dedicates one or more channels of the system to be used for delivering nothing but ads and ad metadata. This channel could be a high bandwidth channel (e.g., 6 MHz). This channel would be encoded and transported in the same manner as any other programming content channel on the system and would include-all ads that are intended for display to any subscriber on the network.

The STBs 200 could be pre-programmed with ad maps (or have ad-maps or instructions on how to create ad-maps downloaded to them) which indicate to the STBs 200 the types of ads they are to download from the ad channel and which types of ads they can ignore.

In one embodiment, each ad can have a tag associated with it (e.g., embedded within it or linked to it). This tag could be a simple identifier or a complete ad vector describing many characteristics of the ad. Such metadata could be transported with the ad or in advance of the ad.

Each STB 200 contains, in memory, a map which tells the STB 200 the particular advertising group or groups to which it belongs, the group or groups, depending on the demographic, psychographic or other information available to the cable service provider about the owner of the STB 200.

The ad tag or vector can be detected by the STB 200 to determine whether or not to store the ad and when and how to display the ad. Such determination can be accomplished in a number of ways depending on the application. If the tag is a simple identifier (of the ad or the ad group to which it belongs) and is sent with the ad, the STB 200 could examine the tag at the moment the advertisement is received and either save it or ignore it based upon the instructions/rules preprogrammed into the STBs 200 ad map.

The tags would indicate for which one (or more) of a plurality of advertising groups the ad is intended. The STBs 200 choose and store those ads that have a matching advertising group in the tag to the advertising group or groups in the STBs 200 advertising group map.

The ad maps can be preprogrammed into the STB 200 before it is delivered to the subscriber. However, more preferably, the maps are sent to the STBs 200 via the network on a periodic basis, such as done via a carousel mechanism. In one embodiment, each ad is assigned a unique identifier. Each ad also is assigned to one or more target groups (i.e., subscribers) for which it may be appropriate. The television service provider constructs a map which indicates, for each unique ad identifier, the target groups for which that ad is intended. The entire map can be sent to each STB 200 so that each STB 200 can utilize the map to identify and pick out the appropriate ads. Alternately, individual tables for each individual advertising group can be generated at the CO/HE 22 and sent to the appropriate STBs 200. In either case, the STB processor having the table examines each ad identifier and compares it to its table. If the ad identifier matches one contained in its table, the STB 200 would pick out that ad and save it. Otherwise, it would ignore the ad.

In another embodiment, the ads delivered on the ad channel(s) could be time-division or channel-division multiplexed by advertising group. In time division multiplexing, ads corresponding to advertising groups are temporally grouped together when transmitted. The STBs 200 could be instructed to download all ads sent on the ad channel during particular time periods, those time periods corresponding to the advertising group or groups to which it belongs. In channel division multiplexing, each advertising group is assigned a different advertising channel. The STBs 200 are instructed to download all ads sent on the particular ad channel(s) to which it corresponds.

In a system such as SDV 30 which operates on an ATM protocol, because the ATM switching occurs at the HE/CO 22, the HE/CO 22 is able to direct different ad channels to one or more of its subscribers' STBs 200 on different VPI/VCIs. In this type of embodiment, one or more ad channels corresponding to one or more specific subscribers could be created and sent to the appropriate subscriber(s). Each STB 200 would be instructed to tune to a particular ad channel (VPI/VCIs) in order to receive and store all the ads on that particular channel. This type of embodiment is advantageous in that the STBs 200 would not need to filter the ads since each ad received on the channel would be appropriate for that STB 200. In such a system, the CO/HE 22 could have its own ad server for generating the ad channel, or could receive ad channels from upstream.

In the case of analog video, the ads could be transmitted just as analog video is transmitted over the network and subsequently digitized at the reception point.

Ads can be delivered to the STBs 200 via low, medium or high width channels and in any of a variety of formats such as streaming media, MPEG2, MPEG4, and in various protocols (ATM, IP).

In a simplest embodiment of the invention, the ads are inserted in the avails in the channel to which the STB 200 is tuned in the memory address order in which they are listed. In a more practical embodiment, the ads are displayed in the avails in accordance with an algorithm that takes into account both the order of the ads and the duration of the avail relative to the duration of the ads such that the duration of the ad(s) inserted into the avail match the duration of the avail.

In accordance with a more preferred embodiment of the invention, the STB 200 maintains multiple ads and executes a subscriber (viewer) determination algorithm for selecting which ad to retrieve based on predetermined criteria. For instance, a different ad may be maintained for each potential subscriber (television viewer) at the subscriber location (e.g., mother, father, child). The algorithm for determining which ads are retrieved could be based on many factors including, the nature of the program to which the STB 200 is tuned, the time of day, recent channel change or volume control history which might be indicative of the particular subscriber. For instance, PCT Publication No. WO 033233A1, entitled "Subscriber Identification System" and assigned to the same assignee as the present invention (corresponding to U.S. patent Application Ser. No. 09/452,893, filed on Dec. 2, 1999), the disclosure of which is incorporated herein by reference, discloses a method and apparatus in accordance with this feature for determining the probable identity or at least characteristics of the particular subscriber in a household that is viewing the television.

In accordance with alternative embodiments of the invention, the ads themselves need not be stored at the STB 200 but can be stored at a separate server on the network which communicates with the STB 200 via the network.

The principles of one embodiment includes means to selectively store ads on the STB 200, and subsequently "insert and play" them at the appropriate time. Ads are received via the ad channel or any other means, stored on a HD 214 (or other storage means including Flash memory) on the STB 200, and selected ads are then substituted or spliced into the programming being delivered or the programming being viewed. The relative timing of ad delivery/storage and subsequent playout can widely vary. The substitution could occur within seconds after the ad is stored, or months after it is stored depending on the application. The STB 200 would contain a mass storage means to store the ads and one or more processors to determine, in one embodiment, which ads to store [note that other embodiments can include profiling and ad matching at the STB], and carry out, inter alia, the substitution. The STB 200 could receive and store each ad delivered on the ad channel. However, in a preferred embodiment, the STB 200 stores only selected ads.

This storing of selected ads can be accomplished in a number of ways. In one embodiment and according to the ad channel delivery method, the ads, in real-time and as they are received, are processed by the STB 200 and only those ads with the appropriate characteristics are stored on the HD 214. This may require some buffering of the ads in the STB memory as the STB 200 processes and determines whether or not to store the ad or alternatively, the information required to determine whether or not to store the ad could be sent in advance of the ad (e.g., as a data service in an ad channel). In another embodiment, all ads are stored on the HD 214 temporarily, and post-processing by the STB 200 deletes ads that are not appropriate or desired.

Figure 4:
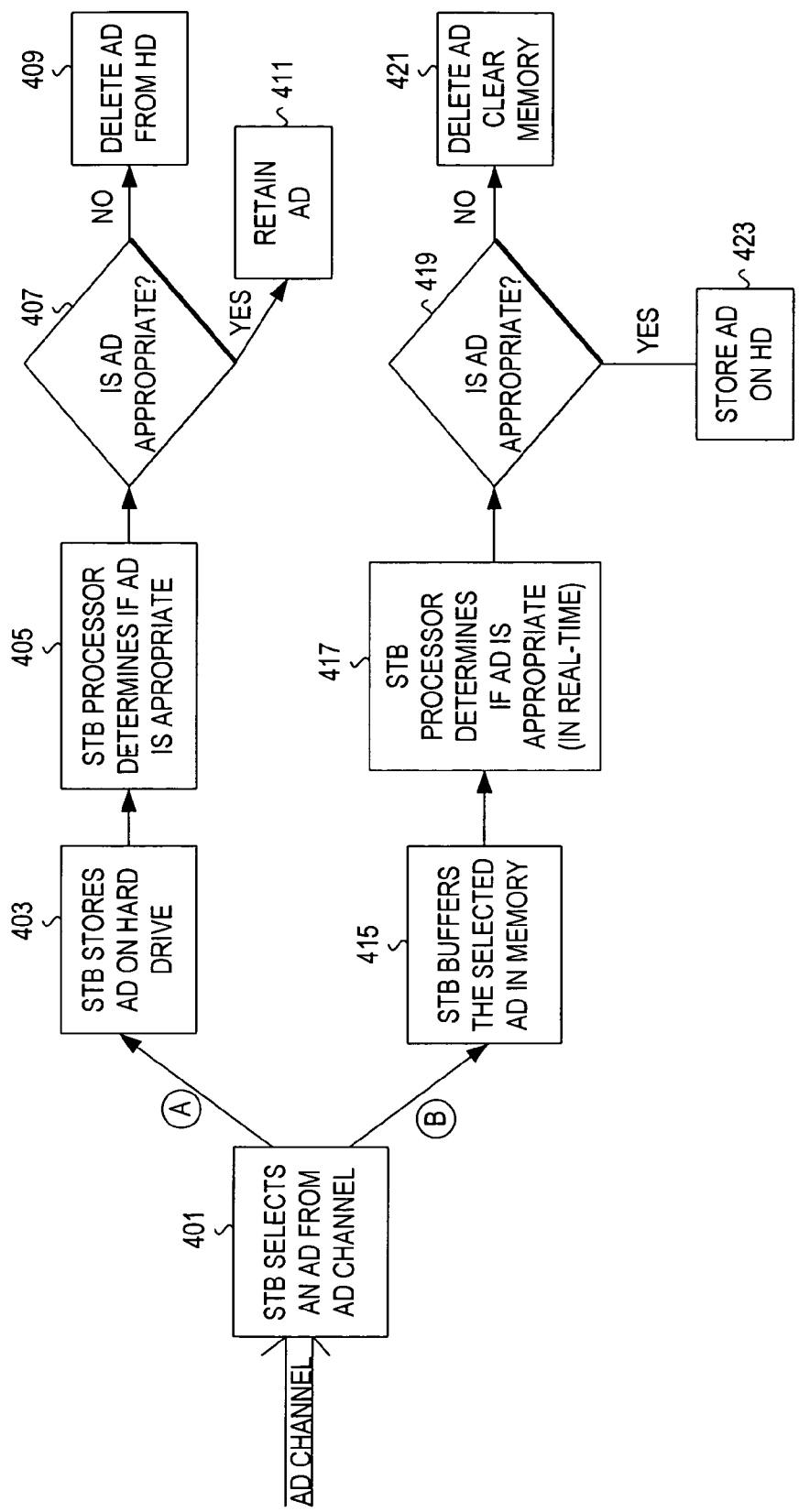
FIG. 4 illustrates an exemplary process flow by which an advertisement is received and stored by the set-top box, according to one embodiment.

FIG. 4 shows exemplary process flows by which an ad is received and stored by the STB 200 according to one embodiment. The ads are delivered to the STB 200, preferably via an ad channel. The STB 200 either (a) stores all the ads on the HD as they are received and subsequently analyzes the stored ads to determine if they are appropriate, deleting from the HD those ads which it determines are not appropriate (note that this subsequent processing can occur immediately after the ad is stored) or (b) determines, in "real time", whether or not the ad is appropriate and stores the ad on the STB HD if the ad is appropriate (and ignores it otherwise).

As shown in FIG. 4, the exemplary process flow begins in step 401, where the STB 200 selects an ad from the incoming ad channel. As mentioned before, the ads may be transmitted to the STB 200 via an ad channel.

Upon receiving such an ad, the STB 200 may either follow the processing associated with branch A or the processing associated with branch B. In branch A, the STB 200, in the step 403 stores the selected ad on the hard drive of the STB 200. In step 405, the STB processor determines if the selected ad is appropriate, i.e., if the incoming ad has one or more characteristics that match the pre-determined criteria of the STB 200. Step 407 is a decision function to evaluate if the ad is appropriate. If in step 407, the ad is found appropriate, it is retained on the HD (step 411). If in step 407, the ad is found inappropriate, the ad is deleted from the HD (step 409).

If the STB 200 chooses to follow the processing associated with branch B, then in step 415, the STB 200 buffers the selected ad in the memory of the STB 200. It is to be noted that this is different than the processing of branch A, where the ad is immediately stored on the HD. Herein, the ad is buffered, e.g., in a cache memory. In step 417, the STB processor determines if the ad is appropriate. Unlike the processing of branch A, such a determination is made in real-time. In step 419, a determination of whether the ad is appropriate is made. If the ad is found appropriate, it is stored on the HD of the STB 200 in step 423. If the ad is not found appropriate, it is deleted from the cache memory and the cache memory is cleared (step 421).

It is to be noted that ads selected for ultimate storage can be determined by a number a factors, including the ads themselves (their IDs and characterizations), the STB profile, processing instructions of the STB, how the ads are delivered to the STB, etc.

In one embodiment, each ad has a tag or label associated with it (e.g., attached/embedded in it or linked to it). This label could be a simple identifier or a complete ad vector describing many characteristics of the ad. Such metadata would be transported with the ad or in advance of the ad as described in Applicant's co-pending U.S. application Ser. No. 09/635,544 filed on Aug. 10, 2000 entitled "Transporting Ad Characterization Vectors".

This tag or ad vector can be used by the STB 200 to determine whether or not to store the ad (and also when and how to display the ad). Such determination can be accomplished in a number of ways depending on the application. In the case that the tag is a simple identifier (of the ad or the group to which the ad belongs), and is sent with the ad, the STB 200 would examine the tag of the ad as soon as the ad is received (on-the-fly), and either save it or ignore/discard it based upon instructions/rules (e.g., a group map) possessed by the STB 200 (i.e., previously sent to the STB by e.g., the operator). Such "on-the-fly" processing may require that each ad received be buffered in the memory while the processing and decision of whether or not to store the ad on the STB is made. As soon as the decision is made, the buffer memory is cleared, and the ad is either discarded or stored on the HD (or other memory).

In one example, the tag/label is pre-pended to the ad (or is at the beginning of the ad). When the ad is received at the STB 200, the tag is received first and a decision immediately made as to whether to store or ignore the ad. Such comparison processing may be accomplished prior to the completion of the ad, at which point the ad is either stored persistently or ignored/discarded. This case is particularly applicable to ads delivered as streaming media.

There are several ways to encode an ad tag or other metadata as will be evident to those of ordinary skill in the art. Such ad labels could be encoded in the vertical blanking interval (VBI). A decoder in the STB 200 would extract this label from the video signal and use it to identify the ad. Other methods for encoding data services in analog video services and how to extract those data are well known to those of ordinary skill in the art.

Such an ad tag could also be encoded as a separate data service as part of each ad or for the ad channel "program". In the case of digitally encoded video (e.g., MPEG-2, DVB), a separate data stream could be created for each ad program stream. This encoded tag could be created for each ad prior to the ad becoming a part of the ad channel program stream, or alternatively, tags could be added for each ad after (or during) the ad channel creation. In the first case, each encoded ad has another elementary stream data service corresponding to the tag (i.e., each ad has an additional program identification (PID)) which carries the tag for the ad. In the second case, there would be one data service for the entire ad channel comprising the ad_labels of the ads. Service for the entire program stream (i.e., a complete and continuous ad channel) carries separate data service (which is a sequence of ad-labels) and there is only 1 additional PID for the program. In either case, the ad tag carried with each ad or in the ad channel and temporally linked to the ad would be used by the STB 200 to identify the ad and ultimately its appropriateness.

In the case of a program data service, the data service could comprise a table that mapped each AD_ID to a label or group designation. The STB 200 would decode this data service, which would identify the ad (e.g., via an AD_ID), or identify the ads group, or both. The data service could also include the timing of the ads.

In the case that the ad label accompanied each ad as a separate data service, the tags/labels could be pre-pended to the ad (i.e., the tag to start at the beginning of the ad), and would only require a brief amount of "ad time" in order to be completely decoded (e.g., <0.1 second). The STB 200 would comprise a data decoder and processor such that as the data stream of the ad (i.e., ad tag) was being decoded, as soon as the label had been decoded, the label would be sent to the processor, and a determination made by the STB whether or not to store the ad (based on instructions or map table at the STB). If necessary, the incoming ad could be buffered until a decision was made whether or not to store the ad. Alternatively, a data service could be sent such that when it was decoded, a map would be constructed of which ads were appropriate to the STB prior to receiving the ad (i.e., the data service "leads" the ads). This would eliminate the need to buffer the ad while processing the labels to determine whether or not to store the ad.

Figure 5:
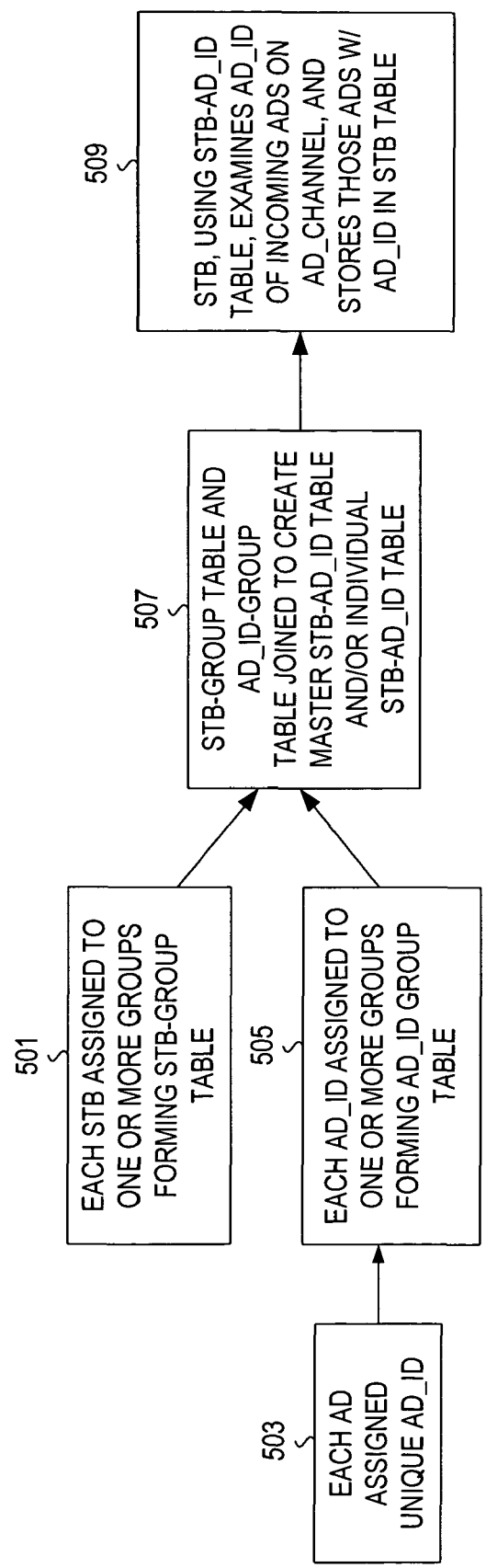
FIG. 5 illustrates example of how tables/maps are formed according to one embodiment.
Figure 6:
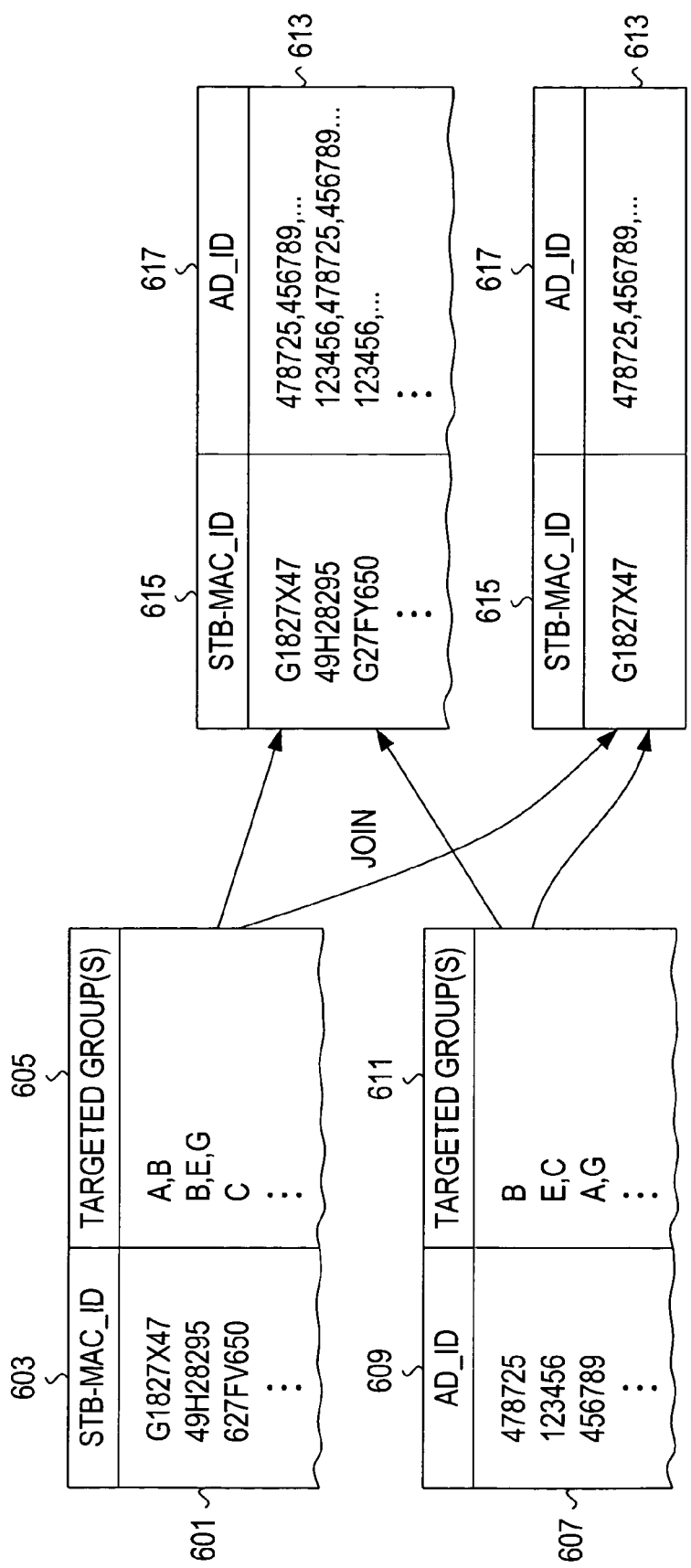
FIG. 6 illustrates example tables/maps according to one embodiment.

Alternatively, the transport stream PSI/SI information could also be used to characterize the ad channel (e.g., carry metadata regarding the ads and their temporal sequence). FIGS. 5 and 6 show methods of encoding ad tags and timing information according to two embodiments of the present invention (VBI data encoding and MPEG data encoding).

FIG. 5 illustrates a method for tagging/labeling ads according to which groups they are appropriate for and allowing each STB 200, belonging to one or more groups, to determine, for each ad received, whether or not to store that ad on the STB 200. In this embodiment, each unique ad is assigned a unique identifier (AD_ID). Thereon, by using AD_IDs, each ad is assigned to one or more target groups (i.e., subscriber groups) that it may be appropriate for. A map table is constructed which indicates, for each AD_ID, what target groups that AD_ID is appropriate for. This entire map table can be sent to each STB (e.g., via the carousel) and the STB 200 can then process this table, identifying those AD_IDs that would be appropriate for its group. Alternatively, this processing could be done upstream (e.g., at the CO/HE) resulting in a map for each STB-group indicating each AD_ID that was appropriate for the STB-group. This STB-AD_ID map could then be sent to the STB 200. In either case, the STB processor has access to this table, the table revealing which AD_IDs the STB 200 should save. As the ads come in on the ad channel, the STB 200 would examine each ad's AD_ID, and compare the AD_ID to its table; if the AD_ID was contained in the table, then the STB would save the ad, otherwise, it would ignore the ad, and the ad would not be stored.

FIG. 5 shows exemplary steps in accordance with this embodiment. The process begins at step 501 where each STB 200 is assigned to one or more groups, thereby an STB-group table is formed, the STB-group illustrating various STBs assigned to various groups. Each STB 200 with its unique identifier (e.g., MAC_ID) is assigned to one or more groups and a master table is formed of all STB-group assignations. At step 503, each ad is assigned a unique AD_ID, and at step 505 each AD_ID is assigned to one or more groups; this results in a master table containing all AD_ID-group associations/assignations, such a master table referred to as an AD_ID-group table. At step 507, the two master tables (STB-group table and AD_ID-group table) are joined (using the groups field common to both tables) to form a master STB-AD_ID table which will contain an entry for each STB 200 and list each ad appropriate for that STB 200. It is to be noted that the master STB-AD_ID table may be an individual STB-AD_ID table corresponding to a particular STB 200. In step 509, from the master table, the ads appropriate for an individual STB 200 can be identified, and this information used by each individual STB 200 to store the ads appropriate for that STB 200. It is to be noted that the entire map can be sent to each STB 200 (e.g., via the carousel) or just the map corresponding to the particular STB 200. Moreover, the determination of which ads are appropriate for a given STB 200 can be performed upstream or at the STB 200 itself.

FIG. 6 illustrates, in an exemplary manner, how a master STB-AD_ID table may be formed. As shown in FIG. 6, an STB-group table 601, having an STB-MAC_ID 603, and target group(s) identification 605, may be joined with an AD_ID table 607, having an AD_ID column 609, and target group(s) identification column 611, to form one or more master STB-AD_ID table 613. For exemplary purposes, master STB-AD_ID table 613 is shown to have an STB-MAC_ID column 615 and an AD_ID column 617.

Figure 7:
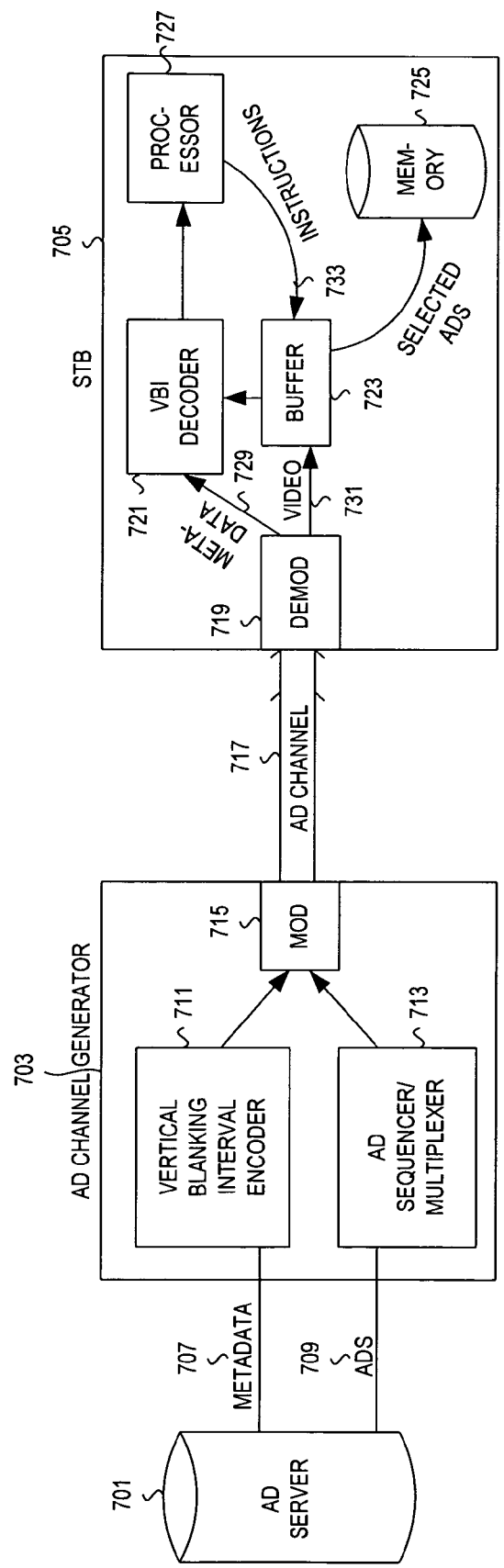
FIG. 7 illustrates exemplary methods of encoding advertisement tags and timing information using vertical blanking interval (VBI) data encoding and Motion Picture Expert Group (MPEG) data encoding.
Figure 8:
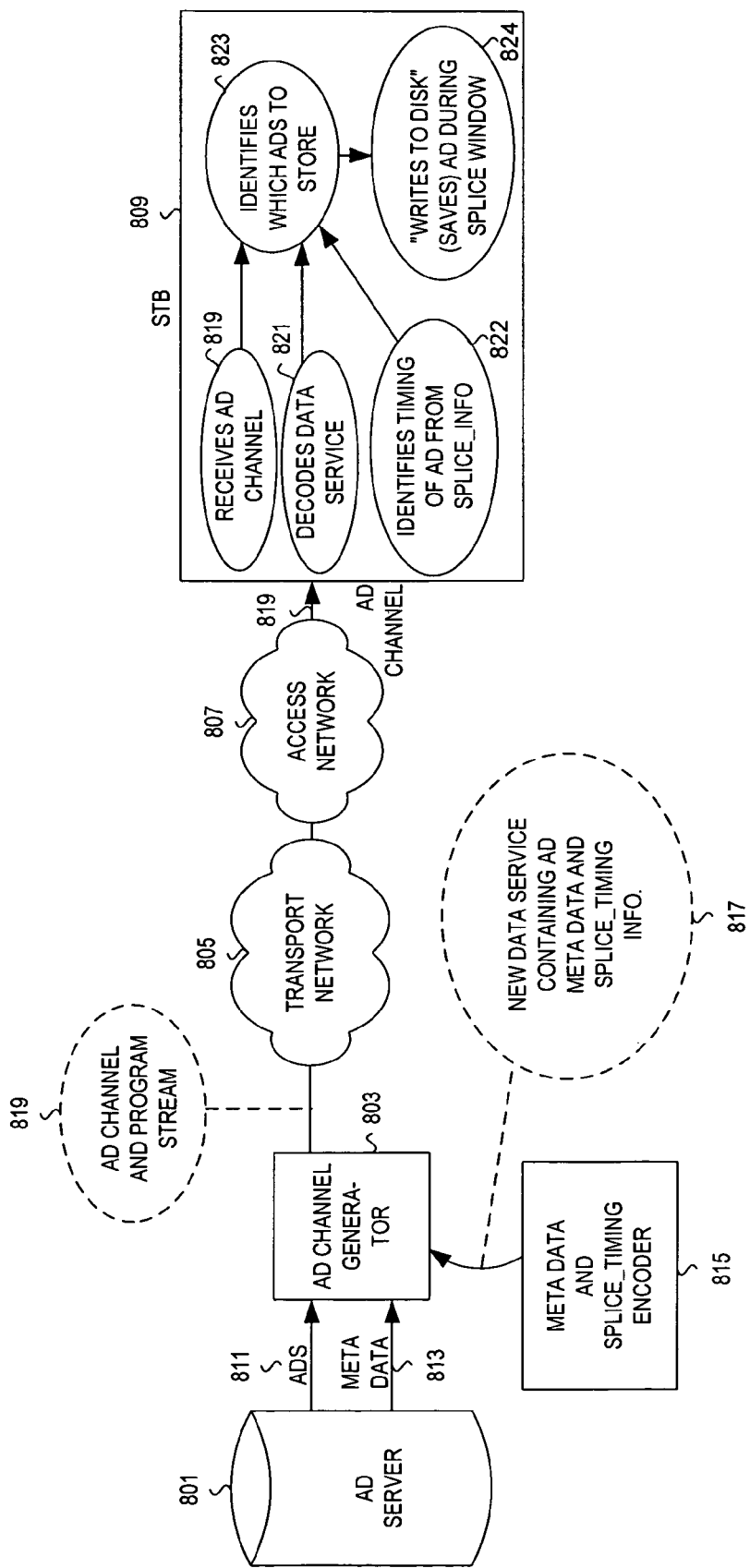
FIG. 8 illustrates exemplary methods of encoding advertisement tags and timing information, according to two embodiments of the present invention.

FIGS. 7 and 8 show methods of encoding ad tags and timing information according to two embodiments of the present invention (VBI data encoding and MPEG data encoding).

Essentially, one or more new data services for the ad channel "program stream" is created and in it is sent both metadata regarding the ads and splice information (the start and end timing) of each ad. The STB 200 receives and decodes this data, examines the metadata for each ad (e.g., its group) and then extracts/saves the appropriate ads by writing to storage the ads received within one or more splice windows (i.e., between the splice in and splice out points).

As illustrated in FIG. 7, an ad channel generator 703, receives metadata 707 and one or more ads 709 from an ad server 701, and then by utilizing a VBI encoder 711, and an ad sequencer/multiplexer 713, transmits the information to a modulator (mod) 715. The output of the ad channel generator 703 is an ad channel 717 that is forwarded to a STB 705.

At the STB 705, the ad channel 717 is received by a demodulator/decoder 719 that splits the ad channel 717 into video stream 731 and metadata 729, wherein the video stream 731 is transmitted to a buffer 723, and the metadata 729 is transmitted to a VBI decoder 721. The metadata information 729 is transmitted to a processor 727 that deciphers the metadata 729 to compute received instruction 733. The instructions 733 are then transmitted to buffer 723 for storage. Based on the instruction 733, the buffer 723 transmits the selected ads to memory 725.

In another embodiment, as illustrated in FIG. 8, an ad channel generator 803 receives ads 811, and metadata 813 from an ad server 801. The ad channel generator 803 also receives metadata and splicing_timing information from a metadata and splicing_timing encoder 815. It is to be noted that the output of encoder 815 may be a new data service containing ad metadata and splicing_timing information 817.

The output of ad channel generator 803 is one or more ad channel(s) (along with program stream) 819. The ad channel and program stream 819 are then transported to STB 809 via a transport network 805 and an access network 807.

The STB 809 receives the ad channel (819), decodes the received data services (821), and identifies the timing associated with the ad (i.e., insertion of the ad) from the splice information (822). Based on 819, 821 and 822, the STB 809 accordingly identifies which ads should be stored (823). The STB 809 stores the ad in an appropriate splice window (824).

Another method of determining which ads, delivered by the ad channel will be stored on a particular STB, is for the STB to be instructed to periodically retain ads. That is, the STB, depending on which group (target group) it belongs is instructed (via downloaded instructions) to save ads sent at a particular time, or within a particular time period, and to discard other ads. In an example embodiment, ads corresponding to target groups are temporally grouped together when transmitted/transported to the STB. Each STB, based on its membership in one or more target groups, and based on instructions received (e.g., from a download carousel, or from another metadata/instruction channel) about the delivery timing of ads appropriate for its group in the ad channel, selectively "picks off" and stores those ads received in the appropriate timing interval.

It should be apparent to those of ordinary skill in the art, that the number of particular embodiments of the invention are practically limitless. Technologies for inserting data such as ads into other data streams is well known. In accordance with the invention, ads stored in digital format could be readily inserted into digital video streams as well as analog video streams. Further, as previously noted, the invention is not limited to insertion of ads but can apply to any form of data and also is not limited to television but can be used to insert any information into any data stream.

Figure 9:
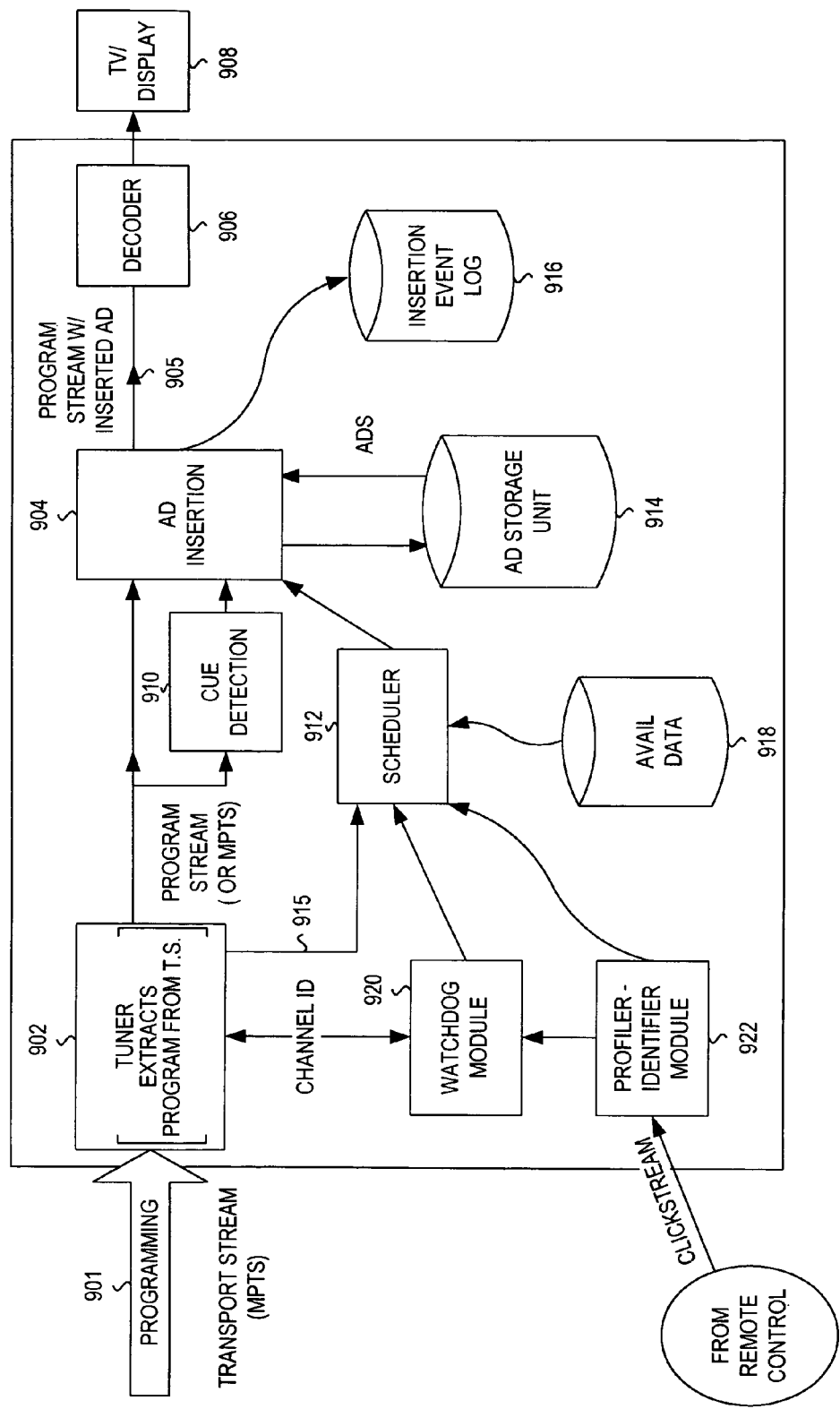
FIG. 9 is a functional block diagram illustrating advertisement scheduling and advertisement insertion, according to one embodiment of the present invention.

FIG. 9 is a functional block diagram illustrating ad insertion, according to one embodiment of the present invention. In this example, the received programming stream 901 is in the form of a DVB transport stream, i.e. a multiple program transport stream (MPTS). A tuner 902 extracts and demodulates the channel selected by the subscriber from the MPTS. This channel carries digital cue tones which are detected by a detection module 910. The ad to be inserted in the next detected avail has already been queued (e.g., from a scheduler 912 using the avail data and prioritization or other scheduling algorithm). An ad insertion module 904 inserts or splices the queued ad according to the cue tone timing. A resulting program stream 905 with the substituted ad is decoded by decoder module 906 and sent to a television 908 or other display device.

The scheduler 912 is the retrieval circuit, which receives the instructions for the organization of the ads in the local memory and then organizes the ads in accordance with the received instructions. In this exemplary embodiment, the scheduler 912 retrieves the instructions from a dedicated control channel 915 in the program stream 901. However, as previously noted, this is just one of many possible transport streams for the instructions. The scheduler 912 also provides a schedule and notifies the ad insertion module 904 of the schedule.

When the cue tone is detected by the detection module 910, the ad insertion module 904 requests the appropriate ad from an ad storage unit 914 which then sends the ad to the insertion module 904. The ad insertion module 904 then inserts the ad with the proper timing.

In this exemplary embodiment, the ads that are stored into the ad storage unit 914 are received over a dedicated ad channel in the media stream. For instance, the scheduler 912 may include circuitry for picking out the appropriate ads for the particular STB from a continuous stream of ads as previously described and writing them to the ad storage unit 914.

A watchdog module 920 notifies the scheduler 912 of any changes that may require update or switching among multiple ads as previously described. For instance, a profiler module 922 can process information, such as data, as to the program being watched and remote control operation such a volume control and channel change control to attempt to determine which particular viewer in a subscriber household is viewing the television in order to choose among the various ads as previously described.

The ad insertion module 904 generates and stores an ad insertion log 916 of all insertion events. This is essentially the schedule of the ads inserted and whether or not they were inserted successfully and/or displayed. The insertion logs 916 will eventually be sent upstream to the CO/HE to be used for billing advertisers based on the ads that have been played at each subscriber's location.

Since FIG. 9 is functional block diagram, the blocks in FIG. 9 do not necessarily correspond to separate hardware components, such as illustrated in FIG. 2. For exemplary purposes, however, blocks 914 and 916 represent portions of memory and might correspond to any one of more of the memories 210, 212, 214 shown in FIG. 2. Functional blocks 904, 906, 910, 912, 920, and 922 represent processing steps and might correspond to the SCU 204 and the channel processing circuit 222 shown in FIG. 2. As processing steps, these blocks may correspond to software executed by any form of digital processor in the SCU 204. However, any one or more of these functions could be performed by dedicated hardware (e.g., an analog circuit) within the SCU 204 or separate therefrom. It should be understood that the term circuit as used in this specification is intended to be all-inclusive and to encompass analog circuits and digital circuits, including FSMs, digital signal processors, computers, CPUs, ASICs, and programmed general purpose processors. Functional block 902 corresponds to one or more of tuner block 218, demodulator block 220 and demultiplexer block 224 in FIG. 2.

As described above, ads stored at the STB, can be inserted into programming and displayed independent of the channel to which the STB is tuned. As long as the STB is on (and tuned to a channel that allows for ad insertion), ads stored on the STB can be inserted, and presented for display. However, it may be desirable to know whether or not the television (or other display device) is on, so that it can be known that the inserted ad is actually displayed. This determination of whether or not the TV is on can be used to determine, for example, whether or not to insert the ad or whether or not to bill for an inserted ad.

If confirmation that an individual ad was actually displayed is required, then one of the steps that is critical for inserting (and displaying) ads from a premises device (e.g., STB) is to first check whether the monitor/display device (e.g., television) is operating (i.e., is on). This may be important so that ads are not inserted by the set top when it is certain that no one is watching (i.e., the TV is off).

There are several means by for determining whether the TV set is operating (i.e., is turned on). Example methods include:

1) using a horizontal oscillator detector to provide a probabilistic determination of whether there is a TV on in the vicinity.

2) detecting the high voltage chroma sub carrier of an operating television.

3) if the television is plugged into the outlet of the set top, detecting current from the plug (small=off vs. operating current when on).

Even if it is confirmed that the TV is on, there may be no one watching the TV, in which case, the ad, although displayed, would not be viewed. There are a number of methods for determining, probabilistically, whether or not anyone is in the room. For example, lack of any recent channel changes, or the fact that the TV has been muted for an extended period of time may be a probabilistic indicator that no one is in the room.

The above identified television detection step could also be advantageously incorporated into a forced channel change addressing system. The set top would not make a forced channel change to an alternative target channel or ad feeder channel, if the television set is not operating.

Incentivizing subscribers to watch part, most or all of the ad, and not switching the channel, or muting the volume can be provided by the service provider or advertiser.

Having thus described a few particular embodiments of the invention, various alterations, modifications, and improvements will readily occur to those of ordinary skill in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method of selectively storing targeted advertisements at subscriber equipment in a television network environment, the method comprising:
   (a) receiving, by the subscriber equipment, a grouping assignment associating the subscriber equipment to at least one of a plurality of targeted groups, each of the targeted groups representing one or more common demographic or psychographic factors, the grouping assignment being made based on demographic or psychographic factors corresponding to viewers associated with the subscriber equipment;
   (b) receiving, by the subscriber equipment, an advertisement transmission signal, wherein the advertisement transmission signal includes at least one advertisement applicable to the at least one targeted group, and metadata for the at least one advertisement, the metadata containing a grouping indicator that associates the at least one advertisement with the at least one targeted group;
   (c) comparing, by the subscriber equipment, the grouping indicator of the at least one advertisement with the grouping assignment of the subscriber equipment;
   (d) retaining the at least one advertisement, by the subscriber equipment, if the grouping indicator of the at least one advertisement matches the grouping assignment of the subscriber equipment;
   (e) detecting, by the subscriber equipment, an interval in a programming stream, received by the subscriber equipment, within which advertisements may be inserted;
   (f) determining, by the subscriber equipment, the current state of a display device counted to the subscriber equipment if the interval has been detected;
   (g) selecting, by the subscriber equipment, at least one of the retained advertisements based at least in part on (i) the grouping indicator of one or more of the retained advertisements; (ii) identifying subscriber traits associated with a current viewer of the display device based on current session interaction data and previous session interaction data; and (iii) a determination of whether the one or more of the retained advertisements fit within the detected interval;
   (h) inserting, by the subscriber equipment, the selected at least one of the retained advertisements into the programming stream within the detected interval it is determined that the display device is currently in an operating state; and
   (i) determining, by the subscriber equipment, based on the current state of the display device, whether at least a temporal portion of the at least one of the retained advertisements has been displayed by the display device.

2. The method of claim 1, wherein step (b) includes receiving splice timing information.

3. The method of claim 2, wherein the metadata and the splice timing information are encoded as a data service on the advertisement transmission signal.

4. The method of claim 3, further comprising:
   (j) decoding the data service and identifying the timing of the at least one advertisement from the splice timing information.

5. The method of claim 4, wherein step (d) includes retaining the at least one advertisement during one or more splice windows identified by the splice timing information.

6. The method of claim 5, further comprising:
   (j) deleting the at least one advertisement if the advertisement is found to be inappropriate.

7. The method of claim 1, wherein the metadata is received in a vertical blanking interval.

8. The method of claim 1, wherein the at least one advertisement is associated with a plurality of targeted groups.

9. The method of claim 1, wherein the grouping assignment relates the subscriber equipment to a plurality of targeted groups.

10. The method of claim 1, wherein each viewer of the subscriber equipment has different characterization information associated therewith and the grouping assignment relating the subscriber equipment to at least one of the targeted groups relates the subscriber equipment to at least one of the targeted groups for each viewer.

11. The method of claim 10 wherein the characterization information is based on one or more demographic factors associated with each of the viewers of the subscriber equipment.

12. The method of claim 10 wherein the characterization information is based on one or more psychographic factors associated with each of the viewers of the subscriber equipment.

13. The method of claim 1, wherein step (c) is performed in real-time or near real-time.

14. An advertisement management system in a television network environment, the system comprising:
   a targeted advertising generator configured to transmit at least one advertisement over a targeted advertising transmission signal path, wherein the at least one advertisement includes metadata containing a grouping indicator that associates the at least one advertisement with at least one of a plurality of targeted groups;
   subscriber equipment configured to receive and present the at least one advertisement, the subscriber equipment storing a grouping assignment that associates the subscriber equipment to at least one of the plurality of targeted groups, each of the targeted groups representing one or more common demographic or psychographic factors, the grouping assignment being made based on demographic or psychographic factors corresponding to viewers associated with the subscriber equipment, the subscriber equipment having:
(a) a processor configured to compare the grouping indicator of the at least one advertisement with the grouping assignment of the subscriber equipment;
(b) a storage device configured to store the at least one advertisement if the grouping indicator of the at least one advertisement matches the grouping assignment of the subscriber equipment;
(c) an insertion processor configured to detect an interval in a programming stream received by the subscriber equipment, within which advertisements may be inserted and to insert at least one of the stored advertisements into the programming stream within the detected interval based on a determination that a display device coupled to the subscriber equipment is currently in an operating state, wherein the at least one retained advertisement is selected based at least in part on (i) the grouping indicator of one or more of the retained advertisements; (ii) identifying subscriber traits associated with a current viewer of the display device based on current session interaction data and previous session interaction data; and (iii) a determination of whether the one or more of the retained advertisements fit within the detected interval; and
(d) a monitoring component configured to determine the current state of the display device when the interval is detected and for determining based on the current state of the display device, whether at least a temporal portion of the at least one of the stored advertisements has been displayed by the display device.

15. The system of claim 14, wherein the subscriber equipment is a set-top box configured to receive signals from and transmit signals to a television and wherein the display device is the television.

16. The system of claim 15, wherein the set-top box comprises a demodulator or decoder for demodulating or decoding the at least one advertisement and the metadata information to differentiate between the at least one advertisement and the metadata information.

17. The system of claim 16, wherein the set-top box further comprises a set-top processor configured to decode the metadata information to determine one or more corresponding instructions.

18. The system of claim 17, wherein the set-top processor associates the one or more corresponding instructions to the received at least one advertisement to select one or more appropriate advertisements.

19. The system of claim 14, wherein the at least one advertisement is associated with more than one targeted group.

20. The system of claim 14, wherein the grouping assignment relates the subscriber equipment to more than one targeted group.

21. The system of claim 14, wherein each viewer of the subscriber equipment has different characterization information associated therewith, and the grouping assignment relating the subscriber equipment to one or more targeted groups relates the subscriber equipment to one or more targeted groups for each viewer.

22. The method of claim 21 wherein the characterization information is based on one or more demographic factors associated with each of the viewers of the subscriber equipment.

23. The method of claim 21 wherein the characterization information is based on one or more psychographic factors associated with each of the viewers of the subscriber equipment.

24. A method of selectively storing and presenting targeted advertisements at subscriber equipment in a television network environment, the method comprising:
(a) receiving, by the subscriber equipment, a grouping assignment associating the subscriber equipment to at least one of a plurality of targeted groups, each of the targeted groups representing one or more common demographic or psychographic factors, the grouping assignment being made based on demographic or psychographic factors corresponding to viewers associated with the subscriber equipment;
(b) receiving, by the subscriber equipment, an advertisement transmission signal, wherein the advertisement transmission signal includes at least one advertisement applicable to the at least one targeted group, and metadata for the at least one advertisement, the metadata containing a grouping indicator that associates the at least one advertisement with the at least one targeted group;
(c) comparing, by the subscriber equipment, the grouping indicator of the at least one advertisement with the grouping assignment of the subscriber equipment; and
(d) retaining the at least one advertisement, by the subscriber equipment, if the grouping indicator of the at least one advertisement matches the grouping assignment of the subscriber equipment;
(e) detecting, by the subscriber equipment, an interval in a programming stream, received by the subscriber equipment, within which advertisements may be inserted;
(f) selecting, by the subscriber equipment, at least one of the retained advertisements based at least in part on (i) the grouping indicator of one or more of the retained advertisements; (ii) identifying subscriber traits associated with a current viewer of the display device based on current session interaction data and previous session interaction data; and (iii) a determination of whether the one or more of the retained advertisements fit within the detected interval; and
(g) inserting, by the subscriber equipment, the selected at least one of the retained advertisements into the programming stream within the detected interval.

* * * * *